United States Patent
Johnson et al.

(10) Patent No.: US 7,619,949 B2
(45) Date of Patent: Nov. 17, 2009

(54) APPARATUS, SYSTEM, AND METHOD FOR A SECONDARY OPTICAL MEMORY IN A REMOVABLE MEDIA CARTRIDGE

(75) Inventors: James W. Johnson, Tucson, AZ (US); David M. Davis, Tucson, AZ (US); Nils Haustein, Zornheim (DE); Craig A. Klein, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 844 days.

(21) Appl. No.: 11/074,085

(22) Filed: Mar. 7, 2005

(65) Prior Publication Data

US 2006/0200624 A1    Sep. 7, 2006

(51) Int. Cl.
*G11B 7/085* (2006.01)
(52) U.S. Cl. .............. 369/30.03; 369/112.16; 369/273; 720/656; 720/725
(58) Field of Classification Search .............. 369/30.03, 369/30.31, 30.27, 30.38, 30.01, 273, 112.16; 700/213–244; 414/279–286; 720/656, 725
See application file for complete search history.

(56) References Cited

U.S. PATENT DOCUMENTS

| | | | |
|---|---|---|---|
| 4,980,818 A | | 12/1990 | Shinmura |
| 5,719,851 A | * | 2/1998 | Yen .............. 720/735 |
| 5,786,955 A | * | 7/1998 | Kori et al. ............ 360/72.1 |
| 6,088,182 A | * | 7/2000 | Taki et al. ............ 360/71 |
| 6,633,454 B1 | | 10/2003 | Martin et al. |
| 6,898,480 B2 | * | 5/2005 | Goodman et al. ........ 700/213 |
| 2003/0179661 A1 | * | 9/2003 | Sato et al. ............ 369/30.68 |
| 2003/0206711 A1 | * | 11/2003 | Berkheimer et al. ........ 386/46 |
| 2004/0181388 A1 | * | 9/2004 | Yip et al. ............ 703/25 |
| 2004/0194151 A1 | | 9/2004 | Earhart |
| 2004/0202055 A1 | | 10/2004 | Knight et al. |
| 2005/0007898 A1 | * | 1/2005 | Maeda ............ 369/30.38 |
| 2005/0144627 A1 | * | 6/2005 | Kim et al. ............ 720/614 |
| 2005/0190660 A1 | * | 9/2005 | Wakelin et al. ........ 369/30.27 |

FOREIGN PATENT DOCUMENTS

JP    63123833    11/1989

* cited by examiner

*Primary Examiner*—Wayne R Young
*Assistant Examiner*—Brenda Bernardi
(74) *Attorney, Agent, or Firm*—Kunzler & McKenzie (57) ABSTRACT

An apparatus, system, and method are disclosed for a data storage apparatus with a secondary optical memory. The data storage apparatus includes a data storage cartridge, a primary data storage medium in the data storage cartridge, and a secondary optical storage medium attached to the data storage cartridge. The data storage apparatus, in one embodiment, includes a beam splitter attached to the data storage cartridge. The beam splitter may be positioned at approximately a 45 degree angle in relation to a data storage surface of the secondary optical storage medium.

20 Claims, 7 Drawing Sheets

APPARATUS, SYSTEM, AND METHOD FOR A SECONDARY OPTICAL MEMORY IN A REMOVABLE MEDIA CARTRIDGE

BACKGROUND OF THE INVENTION

1. Field of the Invention

This invention relates to removable storage media cartridges. More particularly, this invention relates to a secondary optical storage medium in a removable storage media cartridge accessible by both the accessor and the drives of an automated storage library.

2. Description of the Related Art

Automated data storage libraries are known for providing cost effective storage and retrieval of large quantities of data. The data in automated data storage libraries is stored on removable storage media that are, in turn, stored on storage shelves or the like inside the library in a fashion that renders the media, and its resident data, accessible for retrieval. Such media is commonly termed "removable media." Removable storage media may comprise any type of media on which data may be stored and which may serve as removable media, including but not limited to magnetic media (such as magnetic tape or disks), optical media (such as optical tape or disk), holographic media, electronic media (such as PROM, EEPROM, flash PROM, Compactflash™, Smartmedia™, Memory Stick™, etc.), or other suitable media. Typically, the data stored in automated data storage libraries is resident on removable storage media that is contained within a cartridge and referred to as a removable storage media cartridge. An example of a removable storage media cartridge that is widely employed in automated data storage libraries for mass data storage is a magnetic tape cartridge.

In addition to removable storage media, automated data storage libraries typically contain data storage drives that store data to, and/or retrieve data from, the removable storage media. The transport of removable storage media between data storage shelves and data storage drives is typically accomplished by one or more robot accessors or pickers ("accessors"). Such accessors have grippers for physically retrieving the selected removable storage media from the storage shelves within the automated data storage library and transporting such media to the data storage drives by moving in the X (horizontal) and/or Y (vertical) directions. Depending on the library design, more complicated movement may include a Z direction and even radial movements of the gripper.

However, while the removable storage media is stored on a shelf or storage cell, the data is inaccessible. Currently, a removable storage media cartridge typically has the primary data storage media, or if a secondary data storage media is also included with the primary data storage medium, the secondary storage medium is electronic media or the like with a relatively small data storage capacity. The primary storage media is typically used to store the actual data. The secondary storage media can be used to store meta information about the cartridge and the data on it. Typical meta information about the cartridge and the media is the volume serial number (VOLSER), tape directory, media error statistic. For a removable storage media with no secondary memory, whenever the slightest bit of information is needed, the removable storage media must be physically moved from its storage cell to a data storage drive to be mounted and accessed. This is a time consuming process that requires the resources of the robotic accessors and therefore slows read and write requests from a host machine. Simple maintenance operations such as media inventory or reading the directory require that every removable storage media be removed from the storage cell and placed in an available drive to be accessed. Depending on the number of available accessors and drives, the inventory may cause the automated storage library to go offline for several hours. More often required meta information is the VOLSER (inventory) and the media error statistic for predictive maintenance.

A removable storage media with an electronic secondary storage medium or the like allows data such as directory information to be stored on the secondary media. Storing data on an electronic storage media is advantageous in that an accessor or other means can be used to determine the contents of the removable storage media or other pertinent information stored on the electronic storage media without retrieving the removable storage media and placing it in an available drive. However, the minimal storage capacity of the electronic secondary storage media greatly limits its functionality.

When removable storage media without a secondary storage is used in a data drive in a server or other computer, accessing the data may be slow and cumbersome. A user may have to access the primary storage media to determine directory information, data types, file names, or other useful information. Accessing the primary storage media may be much slower than accessing the same information on a secondary storage medium. If an electronic secondary storage medium is included on removable storage media, a server may be able to access some data from the electronic secondary storage medium, but the capacity is limited.

From the foregoing discussion, it should be apparent that a need exists for an apparatus, system, and method for a secondary optical storage medium in a removable media storage cartridge. Beneficially, such an apparatus, system, and method would allow data to be stored on a secondary optical storage medium in a removable media storage cartridge with a higher capacity than currently available electronic secondary storage medium and would allow access of data on the secondary optical storage medium without placing the removable media storage cartridge in an available drive. For example the cartridge accessor can read the meta information from the secondary optical storage medium though an appropriate system making it unnecessary to place the cartridge in a drive.

SUMMARY OF THE INVENTION

The present invention has been developed in response to the present state of the art, and in particular, in response to the problems and needs in the art that have not yet been fully solved by currently available secondary data storage media in removable media cartridges. Accordingly, the present invention has been developed to provide an apparatus, system, and method for a secondary optical storage medium in removable media cartridges that overcome many or all of the above-discussed shortcomings in the art.

The data storage apparatus with a secondary optical memory includes a data storage cartridge, a primary data storage medium in the data storage cartridge, and a secondary optical storage medium attached to the data storage cartridge. These modules in the described embodiments include, in one embodiment, a beam splitter attached to the data storage cartridge. In another embodiment, the beam splitter is positioned at approximately a 45 degree angle in relation to a data storage surface of the secondary optical storage medium.

The secondary optical storage medium, in one embodiment, includes a holographic optical storage media. In another embodiment, the secondary optical storage medium is a rewritable phase change optical storage media. In another embodiment, the secondary optical storage medium is a magneto-optical storage media. In yet another embodiment, the secondary optical storage medium is a dye-polymer optical storage media.

The data storage apparatus is further configured, in one embodiment, so the data storage cartridge is compatible with an automated tape storage library. In another embodiment, the automated tape storage library includes a first optical read/write module attached to an accessor assembly and a second optical read/write module attached to a data storage cartridge drive assembly.

A system of the present invention is also presented to store data on a secondary optical memory in a data storage apparatus. The system may be embodied by an automated tape storage library. In particular, the system, in one embodiment, includes a data storage cartridge, a first optical read/write module, a primary data storage medium in the data storage cartridge, and a secondary optical storage medium attached to the data storage cartridge.

The system may further include a beam splitter attached to the data storage cartridge. In another embodiment, the beam splitter is positioned at approximately a 45 degree angle in relation to a data storage surface of the secondary optical storage medium to allow the first optical read/write module and a second optical read write module to write data to or read data from the secondary optical storage medium while the first and second optical read/write modules are positioned at approximately a 90 degree angle with respect to each other.

In one embodiment, the system includes a processor controlling an optical read/write module. In another embodiment, the system includes at least one host computer connected to the processor. In yet another embodiment, the data storage cartridge is compatible with an automated tape storage library.

In one embodiment, the secondary optical storage medium is a holographic optical storage media. In another embodiment, the secondary optical storage medium is a rewritable phase change optical storage media. In another embodiment, the secondary optical storage medium is a magneto-optical storage media. In yet another embodiment, the secondary optical storage medium is a dye-polymer optical storage media.

A method of the present invention is also presented for storing data on a secondary optical memory in a data storage apparatus. The method in the disclosed embodiments substantially includes the steps necessary to carry out the functions presented above with respect to the operation of the described apparatus and system. In one embodiment, the method includes positioning an optical read/write module to write data to or read data from a secondary optical storage medium attached to a data storage cartridge, activating a light source in the optical read/write module to write data to or read data from the secondary optical storage medium, and writing data to or reading data from the secondary optical storage medium. In one embodiment, positioning an optical read/write module includes moving an optical read/write module approximately into a position to write data to or read data from the secondary optical storage medium and adjusting the optical read/write module to write data to or read data from the secondary optical storage medium.

In an alternate embodiment, the method includes providing a beam splitter positioned at approximately a 45 degree angle in relation to a data storage surface of the secondary optical storage medium and positioning a first optical read/write module to write data to or read data from the secondary optical storage medium through the beam splitter and positioning a second optical read/write module at approximately a 90 degree angle with respect to the first optical read/write module to write data to or read data from the secondary optical storage medium reflected off of the beam splitter to the secondary optical storage medium. In another embodiment, the method includes providing a beam splitter positioned at approximately a 45 degree angle in relation to a data storage surface of the secondary optical storage medium and positioning the data storage cartridge at a location where a second optical read/write module may write data to or read data from the secondary optical storage medium reflected from the beam splitter and positioning the first optical read/write module to write data to or read data from the secondary optical storage medium through the beam splitter.

Another method of the present invention is also for deploying computing infrastructure to store data on a secondary optical memory in a data storage apparatus and for deploying associated computer-readable code into a computing system, where the code in combination with the computing infrastructure is includes positioning an optical read/write module to write data to or read data from a secondary optical storage medium attached to a data storage cartridge, activating a light source in the optical read/write module to write data to or read data from the secondary optical storage medium, and writing data to or reading data from the secondary optical storage medium.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
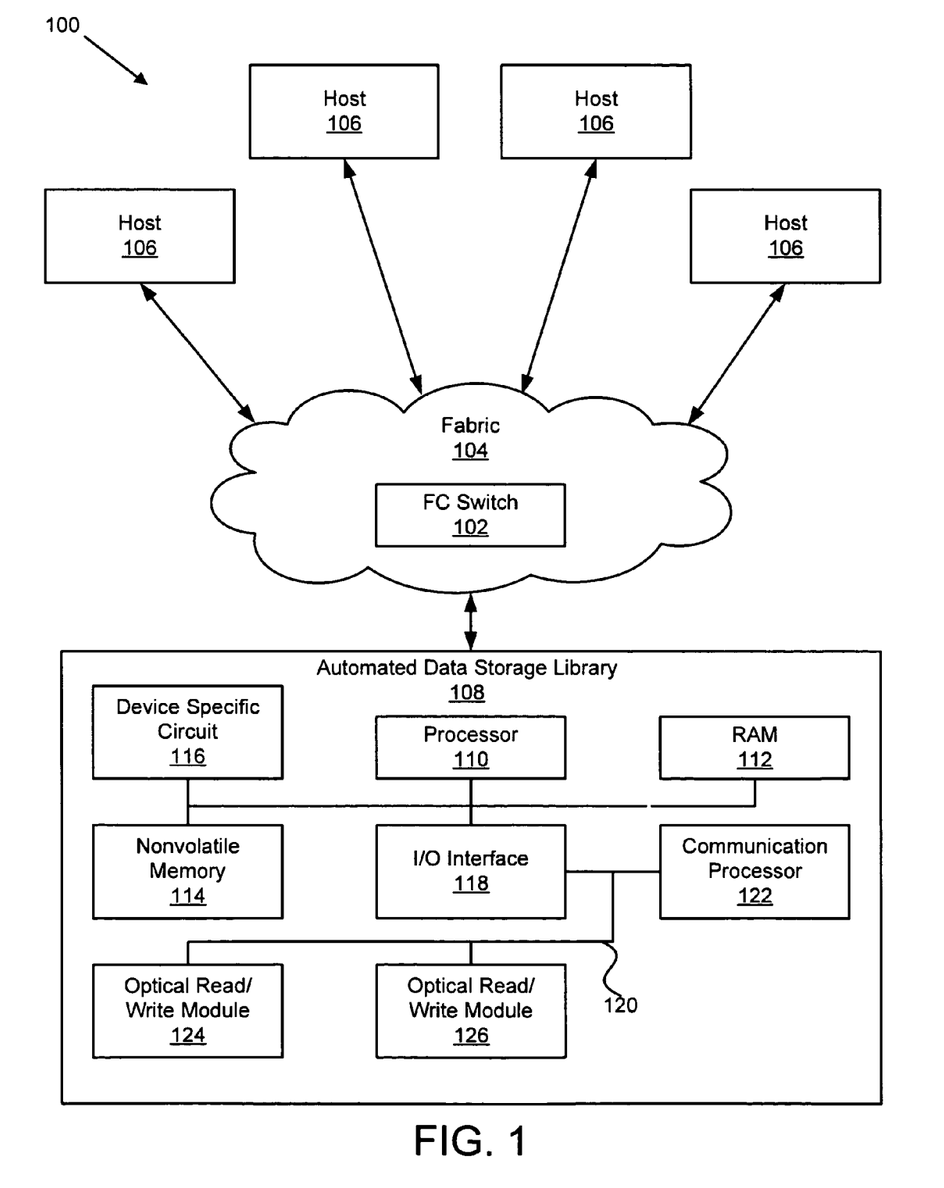
FIG. 1 is a schematic block diagram illustrating one embodiment of a storage area network in accordance with the present invention.

FIG. 1 is a schematic block diagram graphically illustrating one embodiment of a storage area network ("SAN") 100 in accordance with the present invention. In one embodiment, the SAN 100 comprises a switch-access-network, wherein at least one Fibre Channel ("FC") switch 102 implements a FC switching fabric 104. In a further embodiment, the SAN 100 may be implemented using Small Computer Systems Interface ("SCSI") protocol running over the FC fabric 104. Alternatively, the SAN 100 may be implemented over other protocols, such as, but not limited to, Infiniband, FICON, TCP/IP, Ethernet, Gigabit Ethernet, or iSCSI.

In one embodiment, a plurality of host machines 106 is coupled to the fabric 104. The FC switch 102 may be configured to route I/O requests from the host 106 to an automated data storage library 108. Alternatively, the I/O requests may be routed through the Internet (not shown) using standard TCP/IP. The automated data storage library 108 may include a processor 110, RAM (Random Access Memory) 112, a nonvolatile memory 114, a device specific circuit 116, and an I/O interface 118. Alternatively, the RAM 112 and/or nonvolatile memory 114 may be embedded within the processor 110 as could the device specific circuit 116 and the I/O interface 118.

The processor 110 may be implemented as an off the shelf microprocessor, custom processor, Field Programmable Gate Array (FPGA), Application Specific Integrated Circuit (ASIC), discrete logic, etc. The RAM 112 may be configured to hold variable data, stack data, executable instructions, etc. The nonvolatile memory 114 may comprise any type of nonvolatile memory such as EEPROM, flash PROM, battery backup RAM, hard disk drive, or the like. The nonvolatile memory 114 is configured to hold the executable firmware and any nonvolatile data. The I/O interface 118 may be configured to interface the processor 110 with external devices (not shown). In one embodiment, the I/O interface 118 may comprise serial interfaces such as RS-232 or USB (Universal Serial Bus), SCSI, Fibre Channel, etc. In a further embodiment, the I/O interface 118 may comprise a wireless interface such as RF or Infrared.

The device specific circuit 116 provides additional hardware to enable the automated data storage library 108 to perform unique functions such as motor control of a cartridge gripper, etc. Control of such functions within automated storage libraries 108 is well known to those skilled in the art and will not be given further discussion herein. The automated data storage library 108 comprises a grid bus 120 having a communication processor 122. The communication processor 122 is in communication with at least one optical read/write module 124, 126 through grid bus 120.

Figure 2:
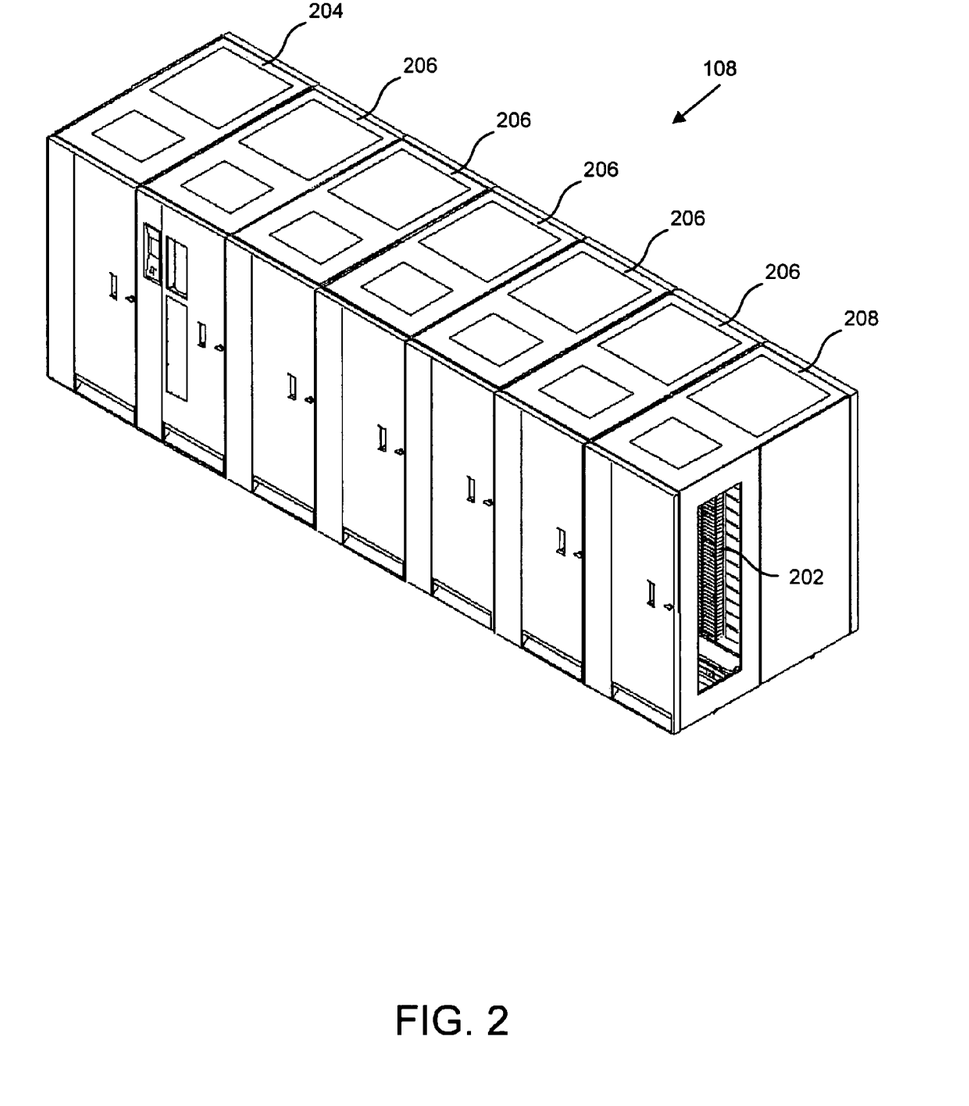
FIG. 2 is an isometric view of an automated data storage library adaptable to implement an embodiment of the present invention.

FIG. 2 illustrates the automated data storage library 108 which stores and retrieves data storage cartridges containing removable storage media in storage cells 202. It is noted that references to "removable storage media" herein also refer to data storage cartridges and, for purposes herein, the two terms are used synonymously. An example of an automated data storage library 108 which may implement the present invention, and has a configuration as depicted in FIG. 1, is the IBM 3584 UltraScalable Tape Library®.

The library 108 of FIG. 2 comprises a left hand service bay 204, one or more storage frames 206, and a right hand service bay 208. A service bay 204, 208 is characterized by its designation as the location in which an accessor may "park" when not in use. Having a service bay 204, 208 at each end of the library 108 allows multiple accessors to each have full access to all of the storage cells 202 and drives within the intermediate storage frames 206. For example, one accessor may park out of the way in the left service bay 204 while a second accessor accesses a drive in the storage frame 206 adjacent to the left service bay 204. All of the service bays 204, 208 and storage frames 206 may be referred to as frames 204-208. As will be discussed, a frame 204-208 may comprise an expansion component of the library 108. Frames 204-208 may be added or removed to expand or reduce the size and/or functionality of the library 108. Frames 204-208 may comprise additional storage cells 202, drives, import/export stations, accessors, operator panels, etc, as will be discussed below.

Figure 3:
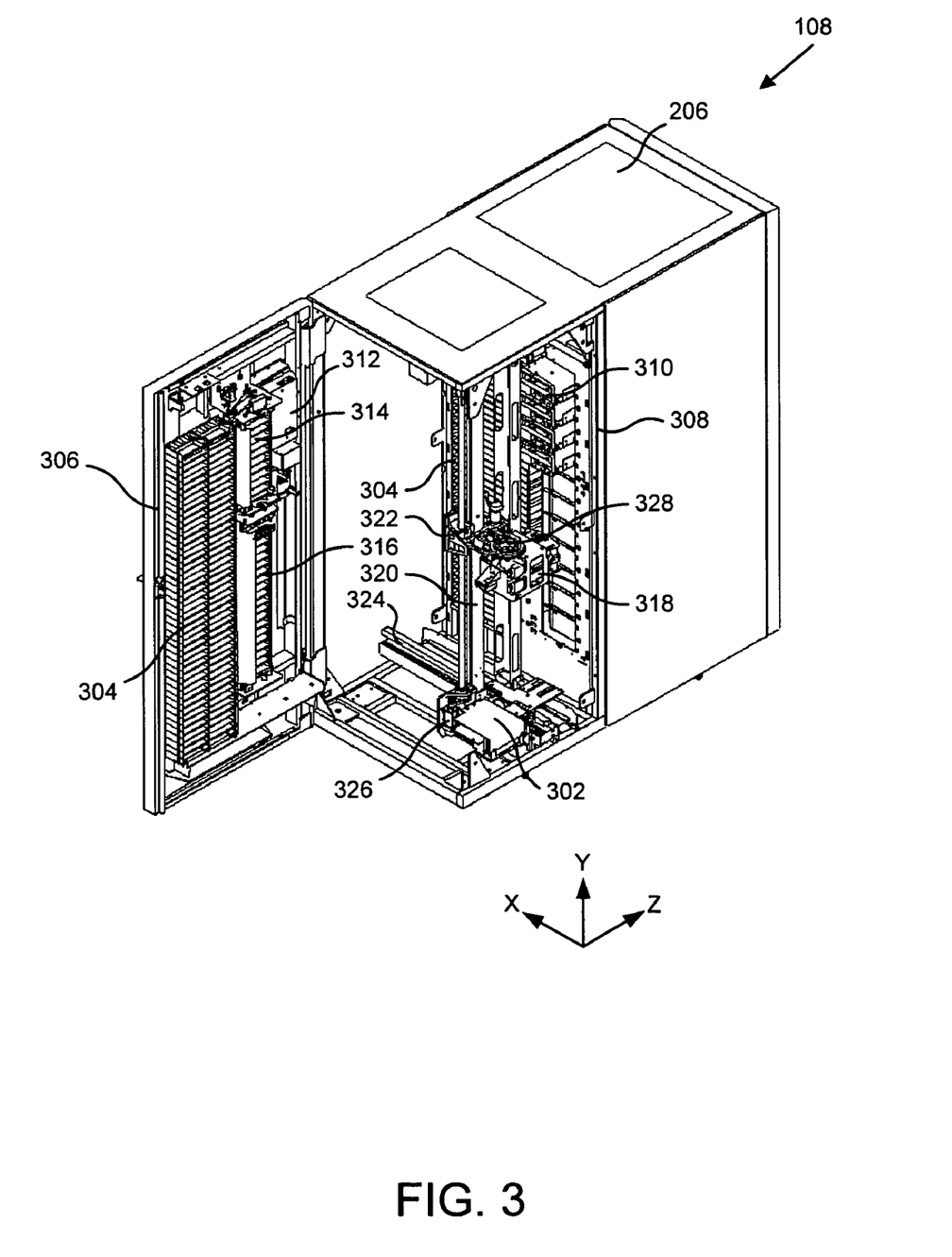
FIG. 3 is an isometric view of a storage frame, including an exemplary basic configuration of some internal components, of an automated data storage library.

FIG. 3 shows an example of a single storage frame 206, which is contemplated to be the minimum configuration of an automated data storage library 108. In this minimum configuration, there is only a single accessor 302 (i.e., there are no redundant accessors) and there are no service bays 204, 208. The library 108 is arranged for accessing data storage media in response to commands from at least one external host system (not shown). In one embodiment, the library 108 comprises a plurality of storage shelves 304; one front wall 306 and one rear wall 308 for storing data storage cartridges that contain data storage media; at least one data storage drive 310 for reading and/or writing data with respect to the data storage media; and the illustrated accessor 302 for transporting the data storage media between the plurality of storage shelves 304 and the data storage drive(s) 310. Both the storage cells 304 and the storage drives 310, as well as other locations suitable for holding data storage media, may be referred to as "data storage locations." The data storage drives 310 may be optical disk drives, magnetic tape drives, or other types of data storage drives as are used to read and/or write data with respect to the data storage media.

The storage frame 206 may comprise an operator panel 312 or other user interface, such as a web-based interface, which allows a user to interact with the library 108. The storage frame 206 may comprise an upper I/O station 314 and/or a lower I/O station 316, which allows data storage media to be inserted into the library and/or removed from the library without disrupting library operation. For example, a user may insert a storage media cartridge into one of the I/O stations 314, 316 while the front wall 306 of the storage frame 206 is closed. The I/O stations 314, 316 also may be referred to as "data storage locations."

Further embodiments of the library 108 also may comprise one or more service bays 204, 208 and/or additional storage frames 206, each having storage cells 304 accessible by an accessor 302.

Each of the storage frames 206 may be configured with different components depending upon the intended function. One configuration of a storage frame 206 may comprise storage shelves 304, data storage drive(s) 310, and other optional components to store and retrieve data from the data storage cartridges. In a further embodiment, the storage frame 206 may be converted to a service bay 204, 208 within a larger automated data storage library 108. Conversely, a service bay 204, 208 may be converted into a storage frame 206, such as when additional frames 204-208 are added onto an existing library 108. The new frames 206 may be bolted onto the end of the existing service bay 204, 208. The existing service bay 204, 208 then may be converted into a storage frame 206 and filled with storage cells 304, drives 310, and the like. Alternatively, a service bay 204, 208 may already contain storage shelves 304 and there may be no conversion required.

In one embodiment, the accessor 302 comprises a gripper assembly 318 for gripping one or more data storage media and transporting the data storage media among the storage shelves 304 and drives 310. The gripper assembly 318 is mounted to a vertical rail 320 (also referred to as a "Y" rail) and may be transported vertically on the vertical rail 320 via a Y rail drive 322. The vertical rail 320 and gripper assembly 318, in turn, may be transported horizontally along a horizontal rail 324 (also referred to as an "X" rail) by an X rail drive 326. If multiple accessors 302 are installed in a single library 108, they may each run on an independent X rail(s) 324 or may run on the same X rail(s) 324. In a further embodiment, the gripper assembly 318 may rotate approximately 180 degrees via a rotational drive 328. In this way, the gripper assembly 318 may access the storage shelves 304 and I/O stations 314, 316 on the front wall 306, as well as the storage cells 304 and drives 310 on the rear wall 308.

Figure 4:
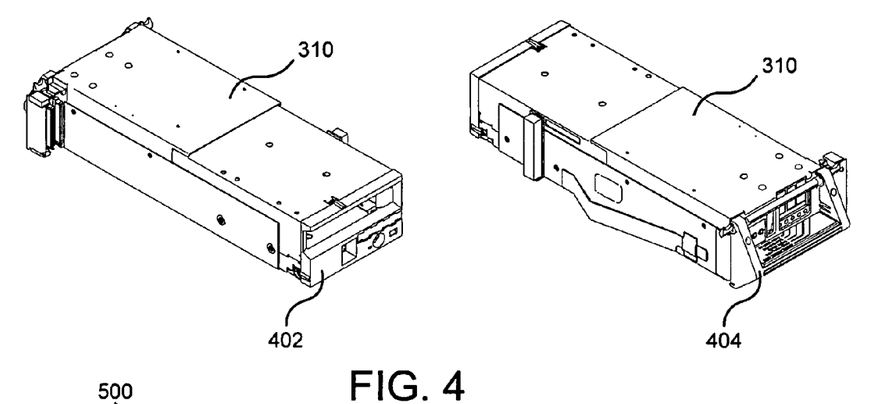
FIG. 4 is an isometric view of the front and rear of a data storage drive that may be used in an automated data storage library to store and/or retrieve data.

FIG. 4 illustrates one embodiment of a data storage drive 310 that may be installed in the automated data storage library 108 of FIG. 1. Specifically, FIG. 4 depicts the front 402 and rear 404 of a data storage drive 310. In the depicted embodiment, the data storage drive 310 comprises a removable media Linear Tape Open (LTO)® tape drive mounted in a drive canister. The data storage drive 310 may also be part of a system 100 without an automated data storage library 108 and may be located in a server, a personal computer, and the like and may be part of an external tape drive. The data storage drive 310 may comprise any removable storage media drive such as, but not limited to, magnetic or optical disk drives, electronic media drives, or other computer readable removable media drives.

Figure 5:
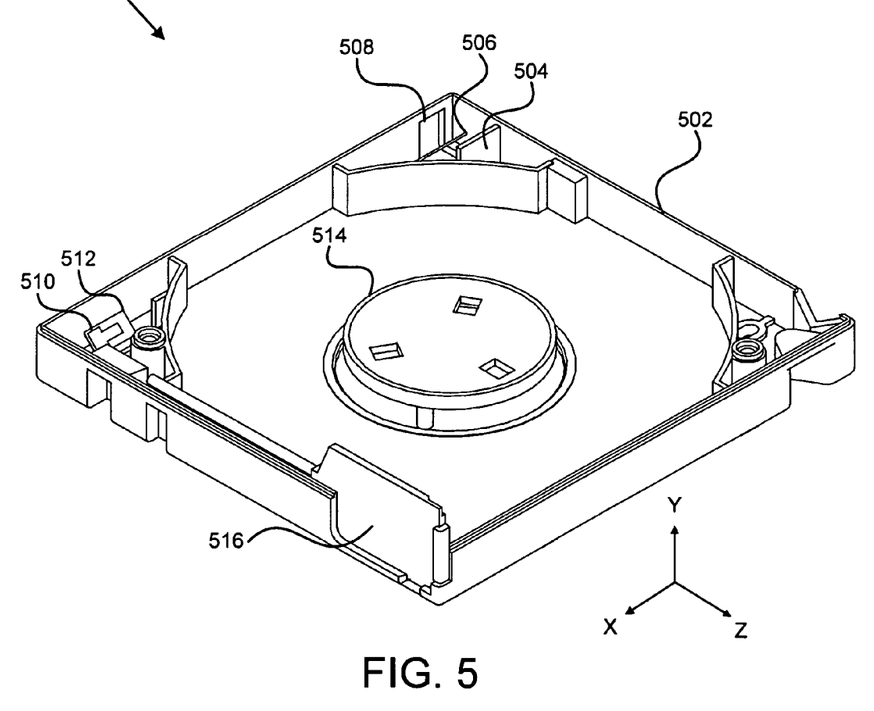
FIG. 5 is an isometric view of a lower half of a data storage cartridge in accordance with the present invention.

FIG. 5 is an isometric view 500 of a lower half of a data storage cartridge 502 in accordance with the present invention. The data storage cartridge 502 includes a secondary memory in the form of an optical storage medium 504. In one embodiment, the data storage cartridge includes a beam splitter 506. The beam splitter 506 is shown at its preferred forty-five degree angle to the Y/Z-axes and in relation to a storage surface of the secondary optical storage medium 504. The secondary optical storage medium 504 is shown perpendicular to the Z-axis. Alternately, the secondary optical storage medium 506 could be perpendicular to the Y-axis (not shown). The data storage cartridge 502, in one embodiment, includes a window 508 that allows a light from an optical read/write module 124 to enter the cartridge 502 from either an accessor 302 or data storage drive 310. In an alternate embodiment, the secondary optical storage medium 504 is located on an outside surface of the data storage cartridge 502.

For reference, a semiconductor cartridge memory 510 on printed circuit board 512 is shown and oriented at a forty-five degree angle in IBM's Linear Tape Open (LTO)® and 3592 tape cartridges. The semiconductor cartridge memory 510 may be accessed via wireless communications and is known to those of skill in the art. The semiconductor cartridge memory 510 has a much lower memory capacity, and therefore lower functionality, as compared to the secondary optical storage medium 504. Brake-button-release 514 and cartridge door 516 are shown which are part of a tape cartridge. The tape is not shown for clarity. The data storage cartridge 502 may comprise various primary storage media such as optical media, magnetic media, or solid-state media.

A data storage cartridge 502 with a secondary optical storage medium 504 may be used in any data storage drive 310 or any other system with means to read the secondary optical storage medium 504. The data storage cartridge 502 with a secondary optical storage medium 504 may be used in conjunction with an automated data storage library 108 or may be used in a system without an automated data storage library 108. Beneficially, a data storage cartridge 502 with a secondary optical storage medium 504 provides a means to store and access data on a data storage cartridge 502 which may be faster or more convenient than accessing data on the primary storage medium of the data storage cartridge 502.

Figure 6:
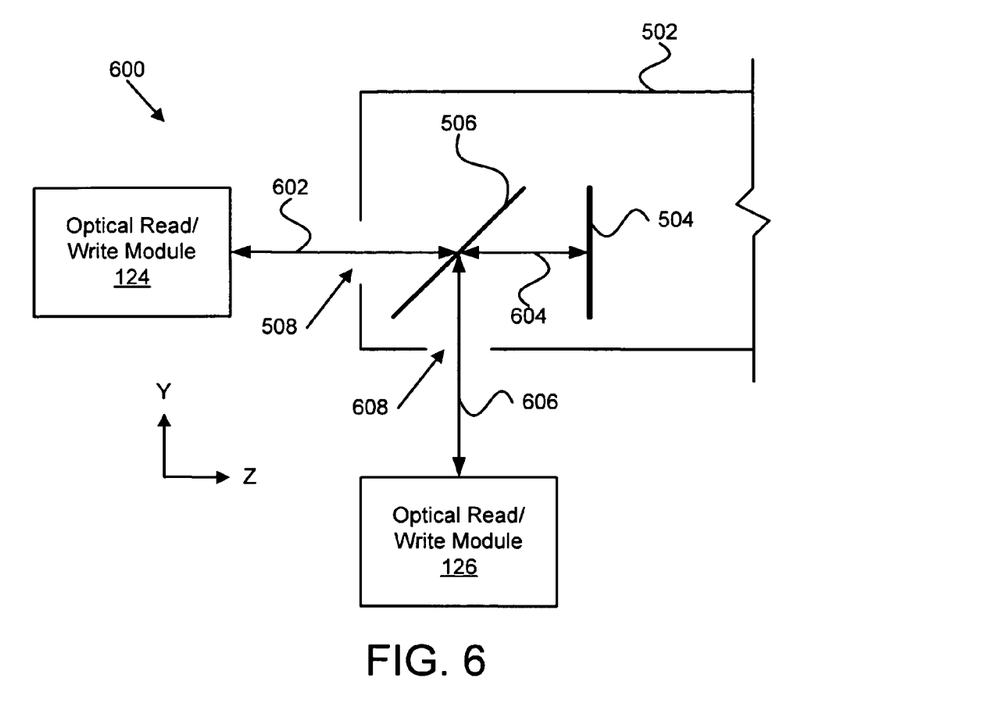
FIG. 6 is a schematic block diagram illustrating one embodiment of a data storage cartridge with a secondary optical storage medium in accordance with the present invention.

FIG. 6 is a schematic block diagram 600 illustrating one embodiment of a data storage cartridge 502 with a secondary optical storage medium 504 in accordance with the present invention. The secondary optical storage medium 504 can be accessed by an optical read/write module 124 positioned approximately perpendicular to the secondary optical storage medium 504 on the Z-axis through a window 508 in the data storage cartridge 502. In one embodiment, a beam of light 602 emanates from the optical read/write module 124 and travels directly to the optical read/write module 124 if no beam splitter 506 is present. Writing and reading data from a secondary optical storage medium 504 is well known to those of skill in the art and will be further explained in relation to FIG. 7. In another embodiment, the secondary optical storage medium 504 is located perpendicular to the Y-axis and the optical read/write module 124 is located along the Y-axis.

In an alternate embodiment, the data storage cartridge 502 includes a beam splitter 506. With a beam splitter included, the optical read/write module 124 on the Z-axis transmits light 602 through the beam splitter 506. A portion of the light 604 is reflected through the beam splitter 506 to the secondary optical storage medium 504. Another portion of the light is reflected off in another direction and is not used.

With a beam splitter 506 included, another optical read/write module 126 can be positioned along the Y-axis with the secondary optical storage medium 504 on the Z-axis as shown. This second optical read/write module could be positioned above, below, or to the side of the data storage cartridge 502 with the beam splitter 506 rotated accordingly. The optical read/write module 126 on the Y-axis transmits light 606 through a second window 608 in the data storage cartridge 502. A portion of the light 604 is reflected off the beam splitter 506 to the secondary optical storage medium 504. Another portion is transmitted through the beam splitter 506 but is unused. Ideally, the beam splitter 506 is positioned at a 45 degree angle with respect to the Y and Z axes. Some variation of the angle of the beam splitter 506 would be allowable, however, any variation is traded against efficiency, light source brightness, or other factors. One skilled in the art will recognize allowable beam splitter 506 angles and tolerances acceptable based on other design parameters.

Ideally, with two optical read/write modules 124, 126, the transmission versus reflectivity ratio of the beam splitter 506 is 50 percent. One skilled in the art will recognize other beam splitter 506 transmission versus reflectivity ratios appropriate to reflect or transmit an adequate amount of light to allow two optical read/write modules to function. The optical read/write modules 124, 126 may be in any position relative to the data storage cartridge 502 as long as the light from the optical read/write modules 124, 126 can reach the secondary optical storage medium 504 directly or by way of the beam splitter 506 if included.

In one embodiment, the optical read/write module 124 on the Z-axis is part of an accessor 302 assembly and the optical read/write module 126 on the Y-axis is part of a data storage drive 310. In another embodiment, the data storage cartridge 502 does not include a beam splitter 506. In this embodiment, the secondary optical storage medium 504 may be accessed from an optical read/write module 124 in an accessor 302 while the data storage cartridge 502 is located on a storage shelf 304 and from another optical read/write module 126 in a data storage drive 310. In this embodiment, both optical read/write modules 124, 126 are positioned perpendicular to the storage surface of the secondary optical storage medium 504 (Z-axis as shown in FIG. 6).

The secondary optical storage medium 504, in one embodiment, is holographic media. In another embodiment, the secondary optical storage medium 504 is a phase change optical media. In another embodiment, the secondary optical storage medium 504 is a magneto-optical media. In another embodiment, the secondary optical storage medium 504 is an organic dye optical media. In yet another embodiment, the secondary optical storage medium 504 is a dye-polymer optical media. The secondary optical storage medium 504 may be any media that reacts to light to store data on the media and read data from the media. One skilled in the art will recognize other possible types of secondary optical storage media 504.

Figure 7:
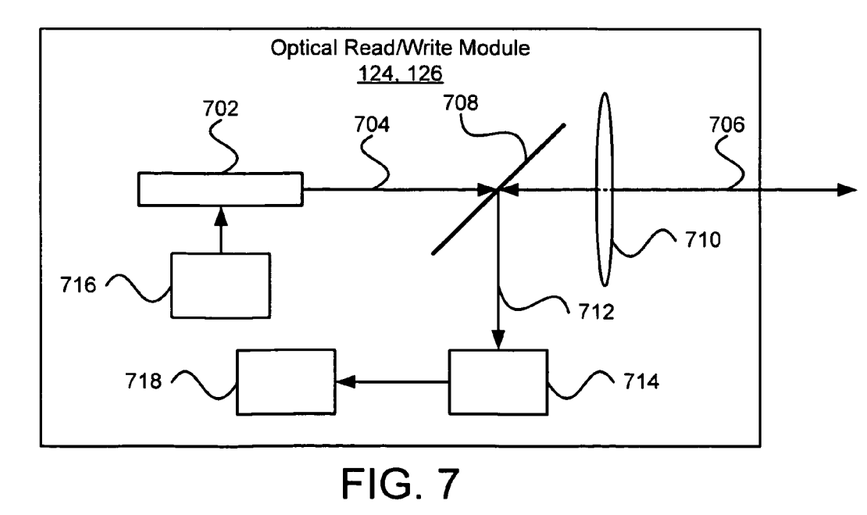
FIG. 7 is a schematic block diagram illustrating one embodiment of an optical read/write module in accordance with the present invention.

FIG. 7 is a schematic block diagram illustrating one embodiment of an optical read/write module 124, 126 in accordance with the present invention. The optical read/write module 124, 126 in FIG. 7 illustrates one possible embodiment. One skilled in the art will recognize other embodiments to read data from and write data to a secondary optical storage medium 504. A light source 702 emits light 704 along the Z-axis, a portion 706 of which passes through an optical-device beam-splitter 708 and is focused via a lens 710 onto the secondary optical storage medium 504 (not shown) of the data storage cartridge 502 (not shown). A portion of light reflects off of the secondary optical storage medium 504, and returns to the optical-device beam-splitter 708, where a portion of the light 712 is reflected and detected by an optical detector 714. Thus, in one embodiment the robotic accessor 302 can both read and write information onto the secondary optical storage medium 504.

The light source 702 may be modulated by a write channel 716 to write information to the secondary optical storage medium 504. The write channel 716 can also receive information from an accessor 302 or a drive 310 via the optical read/write module 124 and 126. From a host 106, the write channel 716 may receive information to be written to the secondary optical storage medium 504. The output of the optical detector 714 may be converted to host 106 usable information via a read channel 718. The output of the read channel 718 is sent to the hosts 106.

Via the optical read/write module 124 in an accessors 302, the accessor 302 could read and write directory information or data files to the secondary optical storage medium 504. The secondary optical storage medium 504 may also be used to store other information such as error history or error correction data. The secondary optical storage medium 504 may be used to temporarily store data that will be transferred to the primary data storage medium at a later time. The secondary optical storage medium 504 may also be used to store the cartridge identification, the type of primary storage medium, a second directory, which drives wrote to the data storage cartridge 502, data types, or cache. One skilled in the art will recognize other uses for the secondary optical storage medium 504 due to its increased capacity over presently available secondary storage media.

The optical read/write module 124 in an accessors 302 may be mounted on a coarse seek mechanism (not shown) such as an accessor 302 which moves perpendicular to the Z-axis, so that all of the secondary optical storage medium 504 may be accessed. The lens 710 may be mounted on a fine seek mechanism (also not shown) which also moves perpendicular to the Z-axis, so that micromechanical displacement of the lens 710 can be effected. The lens 710 may also be mounted on a focus mechanism (not shown) which assists in the focus of the laser beam onto the secondary optical storage medium 504 by moving the lens 710 parallel to the Z-axis. Such fine and coarse seek mechanisms, and focus mechanisms, are well known in the art. A second optical read/write module 126 is preferably in a data storage drive 310 of the automated data storage library 108.

Figure 8:
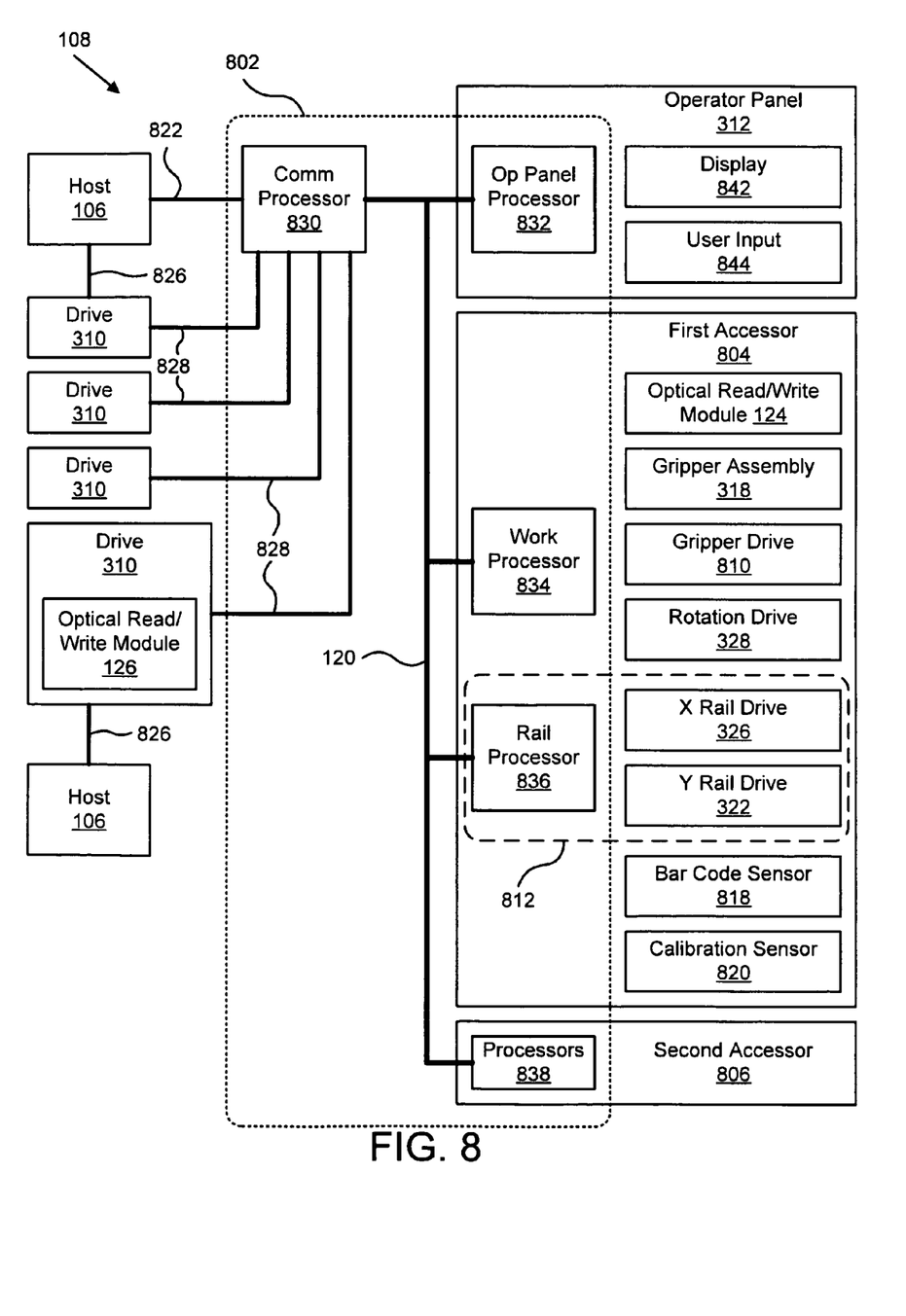
FIG. 8 is a schematic block diagram illustrating one embodiment of a distributed control system within an automated data storage library adaptable to implement an embodiment of the present invention.

FIG. 8 illustrates an embodiment of an automated data storage library 108. The illustrated library 108 employs a distributed control system 802 that includes a plurality of processor nodes. An example of an automated data storage library 108 which may implement the distributed control system 802 is the IBM 3584 UltraScalable Tape Library®.

While the automated data storage library 108 is described as employing a distributed control system 802, the present invention may be implemented in various automated data storage libraries 108 regardless of control configuration, such as, but not limited to, an automated data storage library 108 having one or more library controllers that are not distributed. In further embodiments of the invention, the distributed control system 802 may be distributed among various components of a library 108. For example, components may be located within the service bays 204, 208 or the storage frames 206. Still further, individual components may be located on the operator panel 312, the accessors 302, and so forth. In one embodiment, the data storage library 108 does not include a distributed control system 802. In another embodiment, the distributed functions of the processors 830, 832, 834, 836, 838 are included in a single processor which may be in the form of a server, personal computer, or the like. The server(s) or processor(s) may be located internal or external to the library 108 frames 204, 206, 208. One skilled in the art will recognize control systems and other library configurations compatible with the present invention.

The illustrated library 108 also comprises a first accessor 804 and a second accessor 806. The first accessor 804 and second accessor 806 are substantially similar to the accessor 302 of FIG. 3 and its features. As shown, the first accessor 804 comprises a gripper assembly 318, a gripper drive 810, a rotation drive 328, an X rail drive 326, and a Y rail drive 322. The first accessor 804 includes an optical read/write module 124. Additionally, the first accessor 804 may include a bar code sensor 818 or a calibration sensor 820. The bar code sensor 818 also may be referred to as a reading system. Other configurations of a first accessor 804 would be known to one skilled in the art that are compatible with the present invention. The second accessor 806 is substantially similar to the first accessor 804; however, for clarity and ease of description, the components of the second accessor 806 are not shown.

In the exemplary library 108, the first accessor 804 and the second accessor 806 move their respective gripper assemblies 318 in at least two directions, called the horizontal "X" direction and vertical "Y" direction, as described above, to retrieve and grip, or to deliver and release a data storage cartridge (hereinafter "cartridge") at the storage cells 304 and to load and unload the cartridges at the data storage drives 310. In one embodiment the first accessor 804 moves to position the optical read/write module 124 in position to read a secondary optical storage medium 504 in a data storage cartridge 502. In an alternate embodiment, the optical read/write module 124 is positioned separately by another positioning assembly.

In one embodiment, the automated data storage library 108 receives operational commands from one or more host systems 106. The host systems 106, such as host servers, communicate with the library 108 directly, e.g., on a communications channel 822 or through one or more control ports (not shown). In another embodiment, the host systems 106 may communicate with a communication processor node 830 through one or more data storage drives 310 on one or more communication channels 826, 828.

The hosts 106 may be connected to the data storage drives 310 via a communication channel 826. In one embodiment, the communication channel 826 may be a small computer system interface (SCSI) bus. Alternately, the communication channel 826 may be a Fibre Channel bus, which is a high speed serial data interface that allows transmission over greater distances than the SCSI bus systems. In one embodiment, the data storage drives 310 may be in close proximity to the communication processor node 830 and the communication channel 828 may employ a short distance communication scheme, such as SCSI, or a serial connection, such as RS-422. The data storage drives 310 are also individually coupled to the communication processor node 830 by means of communication channels 828. Alternatively, the data storage drives 310 may be coupled to the communication processor node 830 through one or more networks, such as a common bus network. As is known to those of skill in the art, various communication arrangements may be employed for communication among the hosts 106, the data storage drives 310, and the communication processor node 830.

In one embodiment, the data storage drives 310 include an optical read/write module 126. For clarity, only one optical read/write module 126 is shown in a data storage drive 310. Some or all of the data storage drives 310 may include an optical read/write module 126. In an alternate embodiment, none of the data storage drives 310 include an optical read/write module 126.

The host systems 106 are configured to provide operational commands to access a particular data storage cartridge and move the cartridge, for example, between the storage cells 304 and the data storage drives 310. The commands are typically logical commands identifying the cartridge and/or logical locations for accessing the cartridge. The terms "commands" and "work requests" are used interchangeably herein to refer to such communications from the host system 106 to the library 108 that are intended to result in accessing a particular cartridge within the library 108.

In one embodiment, the exemplary library 108 is controlled by the distributed control system 802. The distributed control system 802 receives the logical commands from one or more hosts 106, determining the required actions, and converting the actions to physical movements of the first accessor 804 and/or second accessor 806. In the illustrated embodiment, the distributed control system 802 comprises a plurality of processor nodes, each having one or more processors. Specifically, the distributed control system 802 includes a communication processor node 830, an operator panel processor node 832, a work processor node 834, and a rail processor node 836. The distributed control system 802 may further include additional processor nodes 838, similar to the communication processor node 830, operator panel processor node 832, work processor node 834 and the rail processor node 836.

In one embodiment, the communication processor node 830 may be located in a storage frame 206. The communication processor node 830 provides a communication link for receiving the operational commands from a host 106, either directly or through the drives 310, or via at least one external interface, e.g., coupled to communication channel 822. The communication processor node 830 may additionally provide a communication link 828 for communicating with the data storage drives 310. In one embodiment, the communication processor node 830 may be located in a storage frame 206, for example, close to the data storage drives 310.

In a further embodiment of the distributed control system 802, one or more work processor nodes 834 are provided, which may be located at the first accessor 804. The work processor nodes 834 are coupled to the communication processor node 830 via a communications network 120. Each work processor node 834 may respond to received commands that are broadcast to the work processor nodes 834 from any communication processor node 830. Additionally, the work processor nodes 834 also may direct the operation of the accessors 804, 806, providing motion control or move commands, for example, to the gripper assembly 318, the gripper drive 810, the rotation drive 328, and the rail processor node 836.

The rail processor node 836 also may be coupled to the network 120. The rail processor node 836 is responsive to the move commands received from the work processor node 834, operating the X rail drive 326, and the Y rail drive 322 to position the gripper assembly 318. Together, the rail processor node 836, the X rail drive 326, and the Y rail drive 322 may be referred to as an "XY system" 812.

In the depicted embodiment, an operator panel processor node 832 is provided at the optional operator panel 312. The operator panel processor node 832 is configured to provide an interface for communicating between the operator panel 312 and the communication processor node(s) 830, the work processor node(s) 834, and the rail processor node(s) 836. In one embodiment, the operator panel 312 also comprises a display 842 and a user input module 844. Together, the display 842 and the user input module 844 are configured to receive commands from a user and display system information.

A communication network 120 is provided within the distributed control system 802, coupling the various processor nodes 830-838. In one embodiment, the communication network 120 may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other types of networks, such as Ethernet, or a wireless network system, such as RF or infrared, may be employed in the library 108 as is known to one of skill in the art. In addition, multiple independent connections and/or communication networks 120 may also be used to couple the various processor nodes 830-838.

An automated data storage library 108 typically comprises one or more controllers to direct the operation of the automated data storage library 108. Host computers 106 and data storage drives 310 typically comprise similar controllers. A controller may take many different forms and may comprise, for example but not limited to, an embedded system, a distributed control system, a personal computer, or a workstation. As used herein, the term "controller" is intended in its broadest sense as a device that contains at least one processor, as such term is defined herein.

Although not depicted herein, a typical controller includes a processor, an electronic memory device such as RAM (Random Access Memory), a nonvolatile memory device, device specific circuits, and I/O interface (refer to FIG. 1). Alternatively, the RAM and/or nonvolatile memory may be contained in the processor, as could the device specific circuits and the I/O interface. The processor may comprise, for example, an off-the-shelf microprocessor, custom processor, FPGA (Field Programmable Gate Array), ASIC (Application Specific Integrated Circuit), discrete logic, or the like.

The RAM (Random Access Memory) is typically used to hold variable data, stack data, executable instructions, and the like. The nonvolatile memory may comprise any type of nonvolatile memory such as, but not limited to, EEPROM (Electrically Erasable Programmable Read Only Memory), flash PROM (Programmable Read Only Memory), battery backup RAM, and hard disk drives. The nonvolatile memory is typically used to hold the executable firmware and any nonvolatile data. The I/O interface comprises a communication interface that allows the processor to communicate with devices external to the controller. Examples may comprise, but are not limited to, serial interfaces such as RS-232, USB (Universal Serial Bus), Ethernet, SCSI (Small Computer Systems Interface), and so forth.

The device specific circuits provide additional hardware to enable the controller to perform unique functions such as, but not limited to, motor control of a cartridge gripper assembly 318. The device specific circuits may comprise electronics that provide, by way of example but not limitation, Pulse Width Modulation (PWM) control, Analog to Digital Conversion (ADC), Digital to Analog Conversion (DAC), etc. In addition, all or part of the device specific circuits may reside outside the controller.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 9:
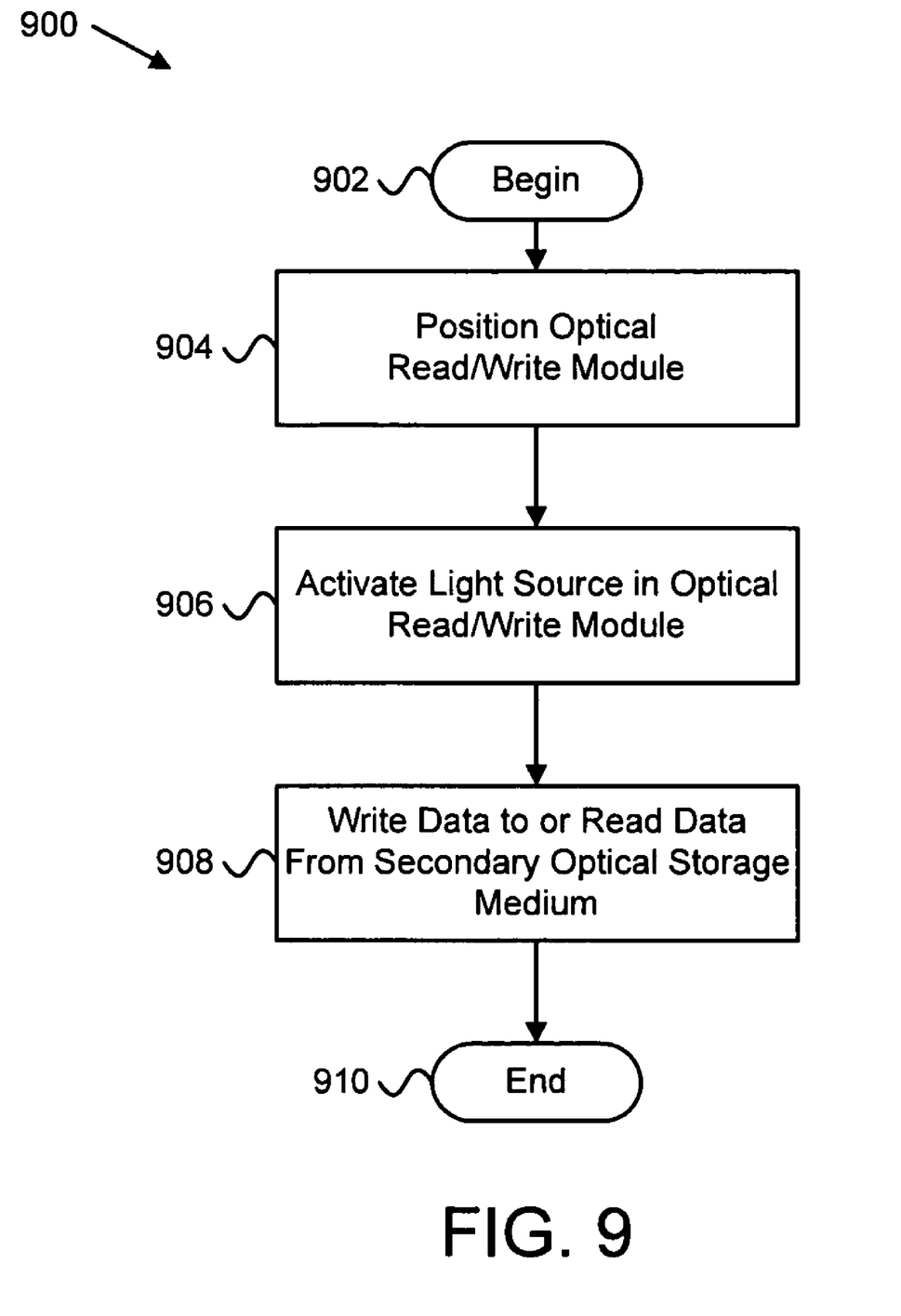
FIG. 9 is a schematic flow chart diagram illustrating one embodiment of a method for storing data on a secondary optical memory in a data storage cartridge in accordance with the present invention.

FIG. 9 is a schematic flow chart diagram illustrating one embodiment of a method 900 for storing data on a secondary optical memory 504 in a data storage cartridge 502 in accordance with the present invention. The method 900 begins 902 with an accessor 302 positioning 904 the optical read/write module 124 to read data from or write data to the secondary optical storage medium 504 in a data storage cartridge 502. The data storage cartridge 502 may be located on a storage shelf 304 for a data storage cartridge 502 or in a data storage drive 310. Positioning the optical read/write module 124 may include fine seeking and focusing of the lens 710 within the optical read/write module 124 in addition to coarse seeking of the accessor 302.

In an alternate embodiment, the data storage cartridge 502 is placed in a data storage drive 310 that includes an optical read/write module 126. In one embodiment, coarse seeking to position the data storage cartridge 502 so the optical storage medium 504 is accessible to the optical read/write module 126 is done by guides, motors, or the like or by the accessor 302 to place the data storage cartridge 502 in a predetermined position. In another embodiment, the optical read/write module 126 may move. Fine seeking and focusing is done by moving the lens 710 within the optical read/write module 126.

The optical read/write module 124, 126 activates 906 the light source 702 within the optical read/write module 124, 126. The optical read/write module 124, 126 then writes data to or reads data from 908 the secondary optical storage medium 504 and the method 900 ends 910.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A data storage apparatus with a secondary optical memory comprising:
    a data storage cartridge;
    a primary data storage medium in the data storage cartridge;
    a secondary optical storage medium attached to the data storage cartridge wherein the secondary optical storage medium is a data storage medium selected from the group consisting of a rewritable phase change optical storage media, a magneto-optical storage media, and a dye polymer optical storage media; and
    a beam splitter attached to the data storage cartridge.

2. The data storage apparatus of claim 1, wherein the beam splitter is positioned at approximately a 45 degree angle in relation to a data storage surface of the secondary optical storage medium.

3. The data storage apparatus of claim 1, wherein the data storage cartridge is compatible with an automated tape storage library.

4. The data storage apparatus of claim 3, wherein the automated tape storage library comprises a first optical read/write module attached to an accessor assembly and a second optical read/write module attached to a data storage cartridge drive assembly.

5. A data storage apparatus with a secondary optical memory comprising:
    a data storage cartridge;
    a primary data storage medium in the data storage cartridge; and
    a secondary optical storage medium attached to the data storage cartridge; and
    a beam splitter attached to the data storage cartridge.

6. The data storage apparatus of claim 5, wherein the beam splitter is positioned at approximately a 45 degree angle in relation to a data storage surface of the secondary optical storage medium.

7. The data storage apparatus of claim 5, wherein the secondary optical storage medium comprises a holographic optical storage media.

8. The data storage apparatus of claim 5, wherein the data storage cartridge is compatible with an automated tape storage library.

9. The data storage apparatus of claim 8, wherein the automated tape storage library comprises a first optical read/write module attached to an accessor assembly and a second optical read/write module attached to a data storage cartridge drive assembly.

10. A system to store data on a secondary optical memory in a data storage apparatus, the system comprising:
    a data storage cartridge;
    a first optical read/write module;
    a primary data storage medium in the data storage cartridge;
    a secondary optical storage medium attached to the data storage cartridge; and
    a beam splitter attached to the data storage cartridge.

11. The system of claim 10, wherein the beam splitter is positioned at approximately a 45 degree angle in relation to a data storage surface of the secondary optical storage medium to allow the first optical read/write module and a second optical read write module to write data to or read data from the secondary optical storage medium while the first and second optical read/write modules are positioned at approximately a 90 degree angle with respect to each other.

12. The system of claim 10, further comprising a processor controlling an optical read/write module.

13. The system of claim 12, further comprising at least one host computer connected to the processor.

14. The system of claim 10, wherein the data storage cartridge is compatible with an automated tape storage library.

15. The system of claim 10, wherein the secondary optical storage medium comprises a data storage medium selected from the group consisting of a rewritable phase change optical storage media, a magneto-optical storage media, a dye-polymer optical storage media, and a holographic optical storage media.

16. A method for storing data on a secondary optical memory in a data storage apparatus, the method comprising:
    positioning an optical read/write module to write data to or read data from a secondary optical storage medium attached to a data storage cartridge wherein the data storage cartridge includes a primary storage medium;
    activating a light source in the optical read/write module to write data to or read data from the secondary optical storage medium;
    writing data to or reading data from the secondary optical storage medium; and
    providing a beam splitter positioned at approximately a 45 degree angle in relation to a data storage surface of the secondary optical storage medium.

17. The method of claim 16, wherein positioning an optical read/write module further comprises moving an optical read/write module approximately into a position to write data to or read data from the secondary optical storage medium and adjusting the optical read/write module to write data to or read data from the secondary optical storage medium.

18. The method of claim 16, further comprising positioning a first optical read/write module to write data to or read data from the secondary optical storage medium through the beam splitter and positioning a second optical read/write module at approximately a 90 degree angle with respect to the first optical read/write module to write data to or read data from the secondary optical storage medium reflected off of the beam splitter to the secondary optical storage medium.

19. The method of claim 16, further comprising positioning the data storage cartridge at a location where a second optical read/write module may write data to or read data from the secondary optical storage medium reflected from the beam splitter and positioning the first optical read/write module to write data to or read data from the secondary optical storage medium through the beam splitter.

20. A method for deploying computing infrastructure to store data on a secondary optical memory in a data storage apparatus and for deploying associated computer-readable code into a computing system, wherein the code in combination with the computing infrastructure is capable of performing the following:

positioning an optical read/write module to write data to or read data from a secondary optical storage medium attached to a data storage cartridge wherein the data storage cartridge includes a primary storage medium;

activating a light source in the optical read/write module to write data to or read data from the secondary optical storage medium;

writing data to or reading data from the secondary optical storage medium; and providing a beam splitter attached to the data storage cartridge.

* * * * *